United States Patent
Sato et al.

(10) Patent No.: US 7,577,668 B2
(45) Date of Patent: Aug. 18, 2009

(54) INFORMATION TRANSMISSION SYSTEM AND INFORMATION TRANSMISSION METHOD

(75) Inventors: Yutaka Sato, Hitachi (JP); Masahiro Nagasu, Hitachinaka (JP); Shigenobu Yanai, Hitachinaka (JP); Keiji Ishida, Hitachinaka (JP); Toshiyuki Murakami, Hitachiota (JP)

(73) Assignees: Hitachi, Ltd., Tokyo (JP); Hitachi Information & Control Systems, Inc., Ibaraki (JP)

( * ) Notice: Subject to any disclaimer, the term of this patent is extended or adjusted under 35 U.S.C. 154(b) by 195 days.

(21) Appl. No.: 10/715,521

(22) Filed: Nov. 19, 2003

(65) Prior Publication Data

US 2004/0103113 A1    May 27, 2004

(30) Foreign Application Priority Data

Nov. 20, 2002    (JP)   ............................ 2002-336140

(51) Int. Cl.
    *G06F 17/30*      (2006.01)
(52) U.S. Cl. ................ 707/100; 707/1; 707/3; 707/5; 707/101; 707/102; 707/103 R; 707/200; 707/201; 702/122; 370/299; 356/73; 398/5
(58) Field of Classification Search .......... 707/100; 702/122; 370/229; 356/73; 398/5
See application file for complete search history.

(56) References Cited

U.S. PATENT DOCUMENTS

| | | | | |
|---|---|---|---|---|
| 5,526,288 | A | * | 6/1996 | Sacks et al. ................. 702/122 |
| 6,072,610 | A | * | 6/2000 | Kuroyanagi et al. ........... 398/5 |
| 6,400,281 | B1 | | 6/2002 | Darby, Jr. et al. |
| 6,842,236 | B1 | * | 1/2005 | Deutsch ....................... 356/73 |
| 2003/0076781 | A1 | * | 4/2003 | Enomoto et al. ............ 370/229 |

FOREIGN PATENT DOCUMENTS

| | | |
|---|---|---|
| JP | 58117749 | 7/1983 |
| JP | 11154891 | 6/1999 |

OTHER PUBLICATIONS

Yee, Wai Gen et al., "Efficient Data Allocation over Multiple Channels at Broadcast Servers", Oct. 2002, IEEE Transactions on Computers, vol. 51, No. 10, pp. 1231-1236.*

* cited by examiner

*Primary Examiner*—Christian P. Chace
*Assistant Examiner*—Farhan M Syed
(74) *Attorney, Agent, or Firm*—Brundidge & Stanger, P.C.

(57) ABSTRACT

A high reliability information transmission system which can continue transmission upon at the occurrence of multiple failures. The system includes two transmission lines and transmission terminals coupled to both of the transmission lines. Data can be transmitted between respective terminals using both transmission lines. The transmission terminals check the data reception status at the corresponding receiving terminals. When data is not being received, the data may be relayed to the receiving terminal using one of the other transmission lines.

8 Claims, 8 Drawing Sheets

FIG. 6a

STATUS TABLE 253 IN THE #1 TRANSMISSION TERMINAL 31 OF VEHICLE 3

| VEHICLE | ORIGINATING TRANSMISSION TERMINAL | RECEIVED COUNTER | NO RECEIVED COUNTER | REPETITION REQUIRED FLAG | REPETITION START WAIT COUNTER | RELAYING PROCESS |
|---|---|---|---|---|---|---|
| VEHICLE 1 | #1  11 | 0 | 3 | 1 | 1→0 | STARTED |
|  | #2  12 | 0 | 3 | 1 | 1→0 | STARTED |
| VEHICLE 2 | #1  21 | 0 | 3 | 1 | 1→0 | STARTED |
|  | #2  22 | 0 | 3 | 1 | 1→0 | STARTED |
| VEHICLE 3 | #1  31 | × | × | × | × | × LOCAL TERMINAL |
|  | #2  32 | 3 | 0 | 0 | — | NOT REQUIRED |
| VEHICLE 4 | #1  41 | 2 | 0 | 0 | — | NOT REQUIRED |
|  | #2  42 | 1 | 0 | 0 | — | NOT REQUIRED |

FIG. 6b

STATUS TABLE 254 IN THE #1 TRANSMISSION TERMINAL 41 OF VEHICLE 4

| VEHICLE | ORIGINATING TRANSMISSION TERMINAL | RECEIVED COUNTER | NO RECEIVED COUNTER | REPETITION REQUIRED FLAG | REPETITION START WAIT COUNTER | RELAYING PROCESS |
|---|---|---|---|---|---|---|
| VEHICLE 1 | #1  11 | 0 | 3 | 1 | 2→1 | WAITING FOR REPETITION |
|  | #2  12 | 0 | 3 | 1 | 2→1 | WAITING FOR REPETITION |
| VEHICLE 2 | #1  21 | 0 | 3 | 1 | 2→1 | WAITING FOR REPETITION |
|  | #2  22 | 0 | 3 | 1 | 2→1 | WAITING FOR REPETITION |
| VEHICLE 3 | #1  31 | 2 | 0 | 0 | — | NOT REQUIRED |
|  | #2  32 | 3 | 0 | 0 | — | NOT REQUIRED |
| VEHICLE 4 | #1  41 | × | × | × | × | × LOCAL TERMINAL |
|  | #2  42 | 1 | 0 | 0 | — | NOT REQUIRED |

INFORMATION TRANSMISSION SYSTEM AND INFORMATION TRANSMISSION METHOD

FIELD OF THE INVENTION

This invention relates to an information transmission system that does not stop transmission when a failure takes place on a transmission line.

BACKGROUND OF THE INVENTION

As the recent network technology advances, information transmission networks have been put to practical use in various fields. The fields contain a railway traffic field that requires high reliability and high safety. In such a field, a transmission failure may cause a serious influence. Therefore, such a field has required a high-reliability information transmission system that will never stop even when multiple failures occur.

Routing and spanning tree algorithms in Ethernet as general-purpose network technologies have been well known as transmission technologies that enable uninterrupted transmission when multiple failures take place. Further, a network technology for railway vehicles has been disclosed in Japanese Application Patent Laid-Open Publication No. Hei 11-154891.

This patent is characterized by providing two transmitters in each railway vehicle, loop-connecting said transmitters as a first transmission line in each vehicle, and connecting two terminals as a second transmission line in each vehicle, whereby, when said first transmission line becomes faulty, said second transmission line is used as an alternative line to continue transmission.

SUMMARY OF THE INVENTION

The routing and spanning tree algorithms have been developed as general-purpose network technologies and excellent because they are available also in complicated network configurations and large-scale networks. Further, as they have been widely used, they enable low-cost network constructions. However, as these technologies employ information exchanges by routers or switching hubs, it takes a long time (e.g. several tens of seconds to several minutes) before they select a new alternative route after detecting a failure. Consequently, it is very difficult to apply these technologies to fields that require quick control responses such as to railway vehicle information transmission systems.

The technology disclosed in the patent document 1 is similar to the above technology in that the technology provides redundant routes and selects an alternative route when a failure occurs. This technology employs a loop configuration and has two information transmission routes (clockwise route and counterclockwise route). Consequently, if a single failure occurs on either of the transmission routes, the technology can continue transmission using the remaining transmission route. Only when failures occur at some points, this technology uses an alternative route to transmit information. If a disconnection failure is assumed, alternative routes must be used at both sides of the failure point. For example, if two disconnections occur at two points, four alternative routes are made active (or three alternative routes are made active when the disconnections are consecutive). In this case, terminals connected to these active alternative routes must share failure information and exchange it each other. Further, it is the occurrence of multiple failures that make the alternative routes active and it is required to recognize whether the number of failures is 1 or more. Therefore, this technology also has a demerit of taking too much time to recover from the failure(s).

Judging from a network topology, when failures occur at two points, three small loops are formed and interconnected on the boundaries of the points, which is very complicated. Therefore, this requires particular transmission control and the conventional general-purpose network technology is not enough. It may be very expensive to divert the conventional network for it.

It is an object of the present invention to provide a simple but high-reliability information transmission system that can continue transmission even when double failures occur on transmission lines.

In one sense, the present invention is characterized by an information transmission system comprising two transmission lines and a plurality of transmission terminals which are connected to said transmission lines to transmit information to each other, wherein each of said transmission terminals is built up to receive information from a sender through said two transmission lines and equipped with a relaying means which, when receiving said information from only one of said transmission lines, sends out the received information to the other transmission line.

The present invention can build up a high reliability network of a simple configuration that receives data from one transmission line which is available if the other transmission line is not available for reception and relays the data to the other transmission line without breaking the transmission even when failures occur at several points in the network.

[Effects of the Invention]

The present invention can provide a simple but high-reliability information transmission system that can continue transmission even when double failures occur on transmission lines.

Other and further objects, features and advantages of this invention will appear more fully from the following embodiments.

BRIEF DESCRIPTION OF THE DRAWINGS

FIG. 6a shows status tables of a transmission terminal 31 in the first embodiment of the present invention.

FIG. 6b shows status tables of a transmission terminal 41 in the first embodiment of the present invention.

DESCRIPTION OF THE PREFERRED EMBODIMENTS

Figure 1:
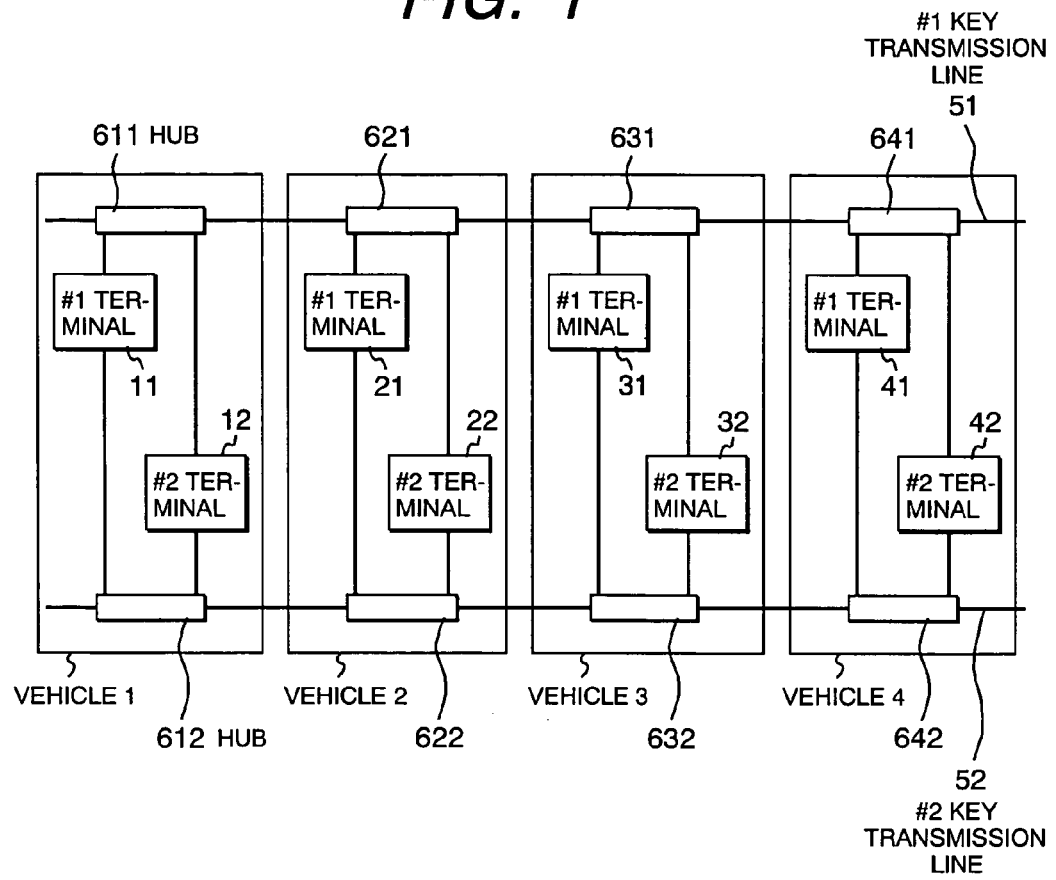
FIG. 1 shows the configuration of a railway information transmission system which is the first embodiment of the present invention.

FIG. 1 shows the configuration of a railway information transmission system which is an embodiment of the present invention. Each of the vehicles 1 to 4 has two transmission terminals (11, 21, 21, 22, 31, 32, 41, and 42). This dual configuration is to assure the redundancy of transmission terminals in the vehicles. In FIG. 1, the upper terminals 11, 21, 31, and 41 form a #1 transmission network and the lower terminals 12, 22, 32, and 42 form a #2 transmission network. These transmission terminals 11 to 41 and 12 to 42 are respectively connected to the first key transmission line 51 and the second key transmission line 52 that connect vehicles to transfer data among transmission terminals. Line concentrators (called hubs) 611 to 641 and 612 to 642 are used to connect said transmission terminals to both key transmission lines 51 and 52. Several devices (not shown in FIG. 1) on each vehicle are connected to each of the transmission terminals 11 to 41 and 12 to 42.

Figure 2:
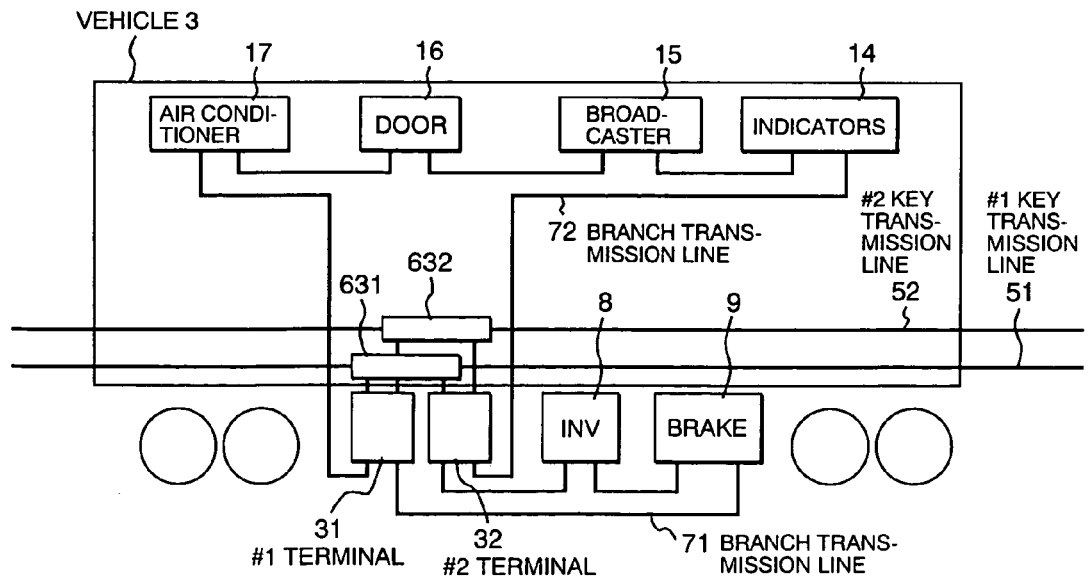
FIG. 2 shows connection of devices on a vehicle in the railway information transmission system which is the first embodiment of the present invention.

FIG. 2 shows connection of devices on a vehicle in the railway information transmission system which is the first embodiment of the present invention. FIG. 2 takes vehicle 3 as an example. For easy wiring, two branch transmission lines 71 and 72 are used to connect the devices. The branch transmission line 71 connects devices such as inverter 8 and brake 9 under the floor and the branch transmission line 72 connects devices such as indicators 14, broadcaster 15, doors 16, and air conditioners 17 on the floor. The transmission terminals 31 and 32 are located at both ends of the of the branch transmission lines 71 and 72 and devices are provided on the branch transmission lines between the transmission terminals. The devices in the vehicle can transfer command values, status information, and so on to and from each other through the branch transmission lines 71 and 72 hubs 631 and 632, and the key transmission lines 51 and 52.

Figure 3:
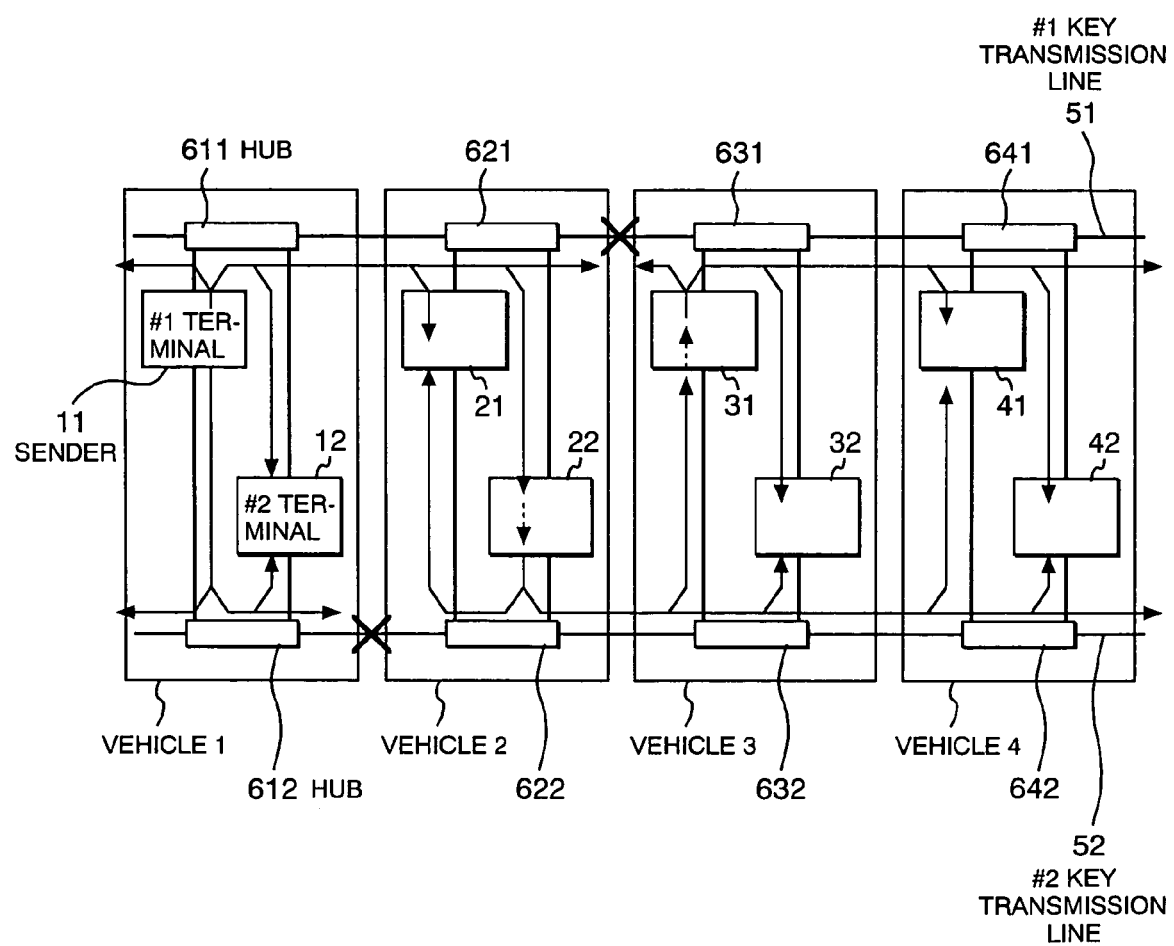
FIG. 3 shows a flow of data in the railway information transmission system which is the first embodiment of the present invention in case several disconnection failures occur in the system

FIG. 3 shows a flow of data among transmission terminals in the railway information transmission system which is the first embodiment of the present invention in case several disconnection failures occur in the system, assuming that #1 transmission terminal 11 of vehicle 1 originates data to both key transmission lines 51 and 52. When no failure occurs in the system, #1 transmission terminals 21 to 41 and #2 transmission terminals 12 to 42 respectively receive identical data from above and under the terminals through both key transmission terminals 51 and 52. When each transmission terminal receives identical data from both directions, they do not relay data assuming that the network is not faulty. However, each transmission terminal has a function to check whether data is coming from only one transmission line (and not coming from the other transmission line) and a relaying means (function) to transfer the received data from one key transmission line to the other transmission line.

Let us assume that disconnections occur on the #1 key transmission line 51 between vehicles 2 and 3 and on the #2 key transmission line 52 between vehicles 1 and 2 (at x-marked points). In this status, the #1 key transmission line 51 cannot transmit data to vehicles 3 and 4. Similarly, the #2 key transmission line 52 cannot transmit data to transmission terminals of vehicles 2 to 4. Further, information from vehicle 1 cannot be transferred to vehicles 3 and 4 because both transmission lines are disconnected. This is a fatal failure.

To prevent such a transmission blocking, each transmission terminal in this embodiment has a function to check a receiving status and a function to relay data. More specifically, as described above, each transmission terminal has a reception status checking function which works in response to data reception from only one of the key transmission lines and a relaying function which passes the received data to the other key transmission line when the check function works. Therefore, the transmission terminal 22 in vehicle 2 on the #2 key transmission line transmits (or relays) the received data to the #2 key transmission line by the reception status checking function which works in response to data reception from only the #1 key transmission line 51. With this, the transmission terminals 21 to 41 on the #1 transmission line and the transmission terminals 32 to 42 on the #2 transmission line can receive data from #1 transmission terminal 11 through the #2 key transmission line 52.

In the similar manner, when the reception status checking function of the transmission terminal 31 in vehicle 3 detects an interruption of data transmission from the transmission terminal 11 through the #1 key transmission line 51, the data relaying function of the transmission terminal 31 relays data (which comes from the transmission terminal 11 through the #2 key transmission line 52) to the #1 key transmission line 51. With this, transmission terminals 32, 41, and 42 can receive the data.

Consequently, all transmission terminals can receive identical data from both upper and lower input ends. In other words, the first embodiment of the present invention can continue normal data transmission even when multiple failures occur in the above network.

In the first embodiment, it is the transmission terminal 22 that relays data and continues data transmission over the key transmission lines when a disconnection occurs on the #2 key transmission line 52 between vehicles 1 and 2. Similarly, it is the transmission terminal 31 that relays data and continues data transmission to both key transmission lines when a disconnection occurs on the #1 key transmission line 51 between vehicles 2 and 3. These transmission terminals run independently of each other, need not exchange information with each other, and can continue transmission autonomously. The data which the transmission terminal 31 relays is what the transmission terminal 22 relays to the #2 key transmission line. However, the transmission terminal 31 need not be conscious of whether the data is repeated by the transmission terminal 22 or the data comes directly from the transmission terminal 11.

The above processing is also applicable to data originated by any other transmission terminal (than transmission terminal 11). Each transmission terminal checks the reception status of each originating transmission terminal, relays data if necessary, and thus can continue data transmission to all transmission terminals even when multiple failures occur on the transmission lines.

This embodiment can also continue data transmission even when the number of vehicles changes and when more failures occur. Further, also when one of the line concentrators (hub) or transmission terminals is disabled to transmit data to one of the key transmission lines (instead of a line disconnection), data transmission can be continued by the reception checking function and the data relaying function. Furthermore, also when a hub 612 gives out or the originating transmission terminal 11 is disabled to transmit to the #2 transmission terminal 52 instead of a disconnection of the #2 key transmission line between vehicles 1 and 2, it may be readily understood that the transmission terminal 22 can repeat data to continue data transmission.

It can be a remote transmission terminal or a #1 or #2 transmission terminal that repeats data. In the above example, it is decided that a repeatable transmission terminal nearest to the disconnection point performs data repetition. Further, it is assumed that a #1 transmission terminal is used to relay data to the #1 key transmission line 51 or #2 transmission terminal is used to relay data to the #2 key transmission line 52.

Its determining method will be explained below taking, as an example, data repetition in the right half of the #1 key transmission line 51 (to the right of the disconnection point) of the above embodiment). The reception checking functions of the transmission terminals 31 and 41 detect interruption of data transmission from transmission terminals in vehicles 1 and 2. Then, data repetition (relaying) is to be carried out. Here, priorities corresponding to distances such as a difference between the vehicle number of the originating vehicle and the number of a receiving vehicle are provided in the form of a waiting time before the processing starts. When the reception checking function detects that any transmission terminal starts data relaying in this waiting time, this transmission terminal does not require data relaying and stops the processing. In other words, the transmission terminal 31 first starts data relaying. The transmission terminal 41 detects thereof and does not start data relaying. Therefore, one of the repeatable transmission terminals closest to the disconnection point performs data relaying. This method can build up a transmission system of higher reliability as the other transmission terminal automatically starts to relay data after a lapse of said waiting time even when the data relaying function is disabled.

However, when a failure occurs on the #1 key transmission line of FIG. 1, it seems to the transmission terminals 31 and 41 that transmissions from vehicles 1 and 2 are blocked simultaneously and that the failure is in the same side of the vehicles 3 and 4. Therefore, it is desirable to make the above waiting time setting identical assuming that the transmissions are blocked by an identical failure. In other words, the transmission terminal 31 tries to set waiting times 2 and 1 for originating transmission terminals in vehicles 1 and 2 according to the distances therebetween, that is, to set waiting time 1 for vehicle 2 which is closer to the transmission terminal 31 also for vehicle 1 which is further from the transmission terminal 31. This can shorten the waiting time before repetition of data coming from vehicle 1.

In the above-described first embodiment, the #1 transmission terminals work to relay data from the #2 key transmission line 52 to the #1 key transmission line 51 while the #2 transmission terminals work to relay data from the #1 key transmission line 51 to the #2 key transmission line 52. Therefore, each terminal can relay data in one direction only, which can simplify the internal processing of each transmission terminal.

One of the other methods uses for example #1 transmission terminals to relay data coming from a #1 transmission terminal and #2 transmission terminals to relay data coming from a #2 transmission terminal. This method need not be conscious of transmission terminals in the other transmission line and each terminal can relay data in one direction only, which can simplify the internal processing of each transmission terminal.

To make the redundancy higher, it is also possible to make either of the transmission lines relay data and to make the other transmission line relay data when the current transmission line becomes disabled. Although this method can assure higher redundancy, the method makes terminal processing a little complicated. In either case, a method should be selected according to the processing abilities of transmission terminals and the required degree of redundancy.

Figure 4:
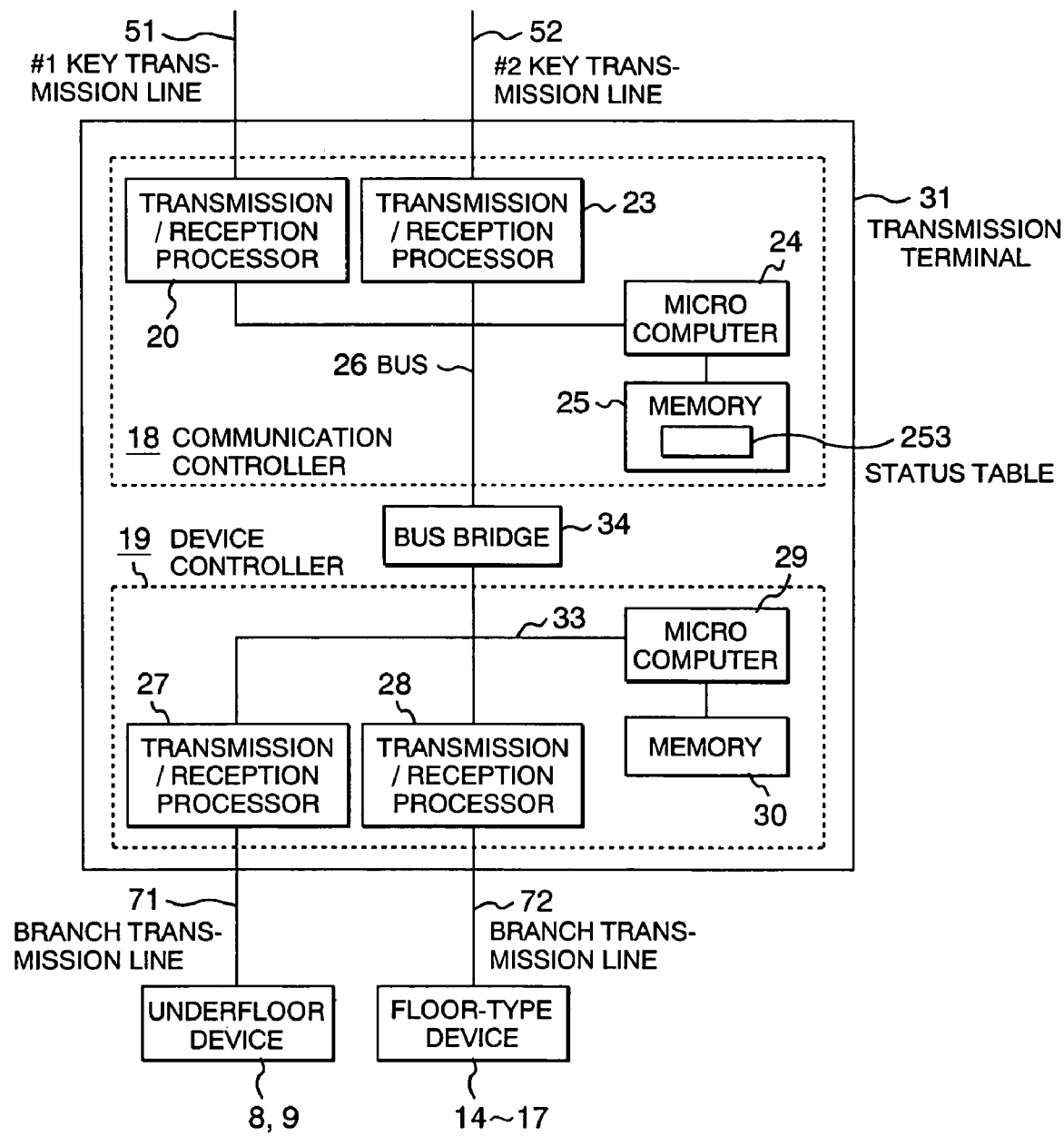
FIG. 4 shows a schematic diagram of a transmission terminal in the railway information transmission system which is the first embodiment of the present invention.

FIG. 4 shows a schematic functional diagram of a transmission terminal equipped with a reception checking function and a data relaying function in the railway information transmission system which is the first embodiment of the present invention. This diagram takes the transmission terminal 31 of vehicle 3 as an example. The transmission terminal 31 comprises a communication controller 18 which transfers data to and from the key transmission lines 51 and 52 and a device controller 18 which communicates with respective devices in vehicles.

The transmission control block 18 contains transmission/reception processors 20 and 23 which are respectively connected to key transmission lines 51 and 52, a microcomputer 24 and memory 25 which control these transmission/reception processors to check the receiving status and relay data. Memory 25 is used to temporarily store data during reception checking and data relaying and equipped with a status table 253 to be described later. The transmission/reception processors 20 and 23 are connected to the microcomputer 24 with a bus 26.

The device control block 19 contains transmission/reception processors 27 and 28 which are respectively connected to branch transmission lines 71 and 72, and a microcomputer 29 for data processing. Memory 30 is used to temporarily store data during data processing. The transmission/reception processors 27 and 28 are connected to the microcomputer 29 with a bus 33. As already described in FIG. 2, the branch transmission lines 71 and 72 are respectively connected to devices 8 and 9 under the floor and to devices 14 to 17 on the floor.

The buses 26 and 33 of the communication controller 18 and the device control block 19 are interconnected with a bus bridge 34 to transfer information between the controllers 18 and 19 whose timings are different. This enables transfer of data from devices to the key transmission line directly or after processing and transfer of data from the key transmission line to the related devices. The microcomputer for data processing in this example can be substituted by a digital signal processor (DSP), a gate array, or the like.

Figure 5:
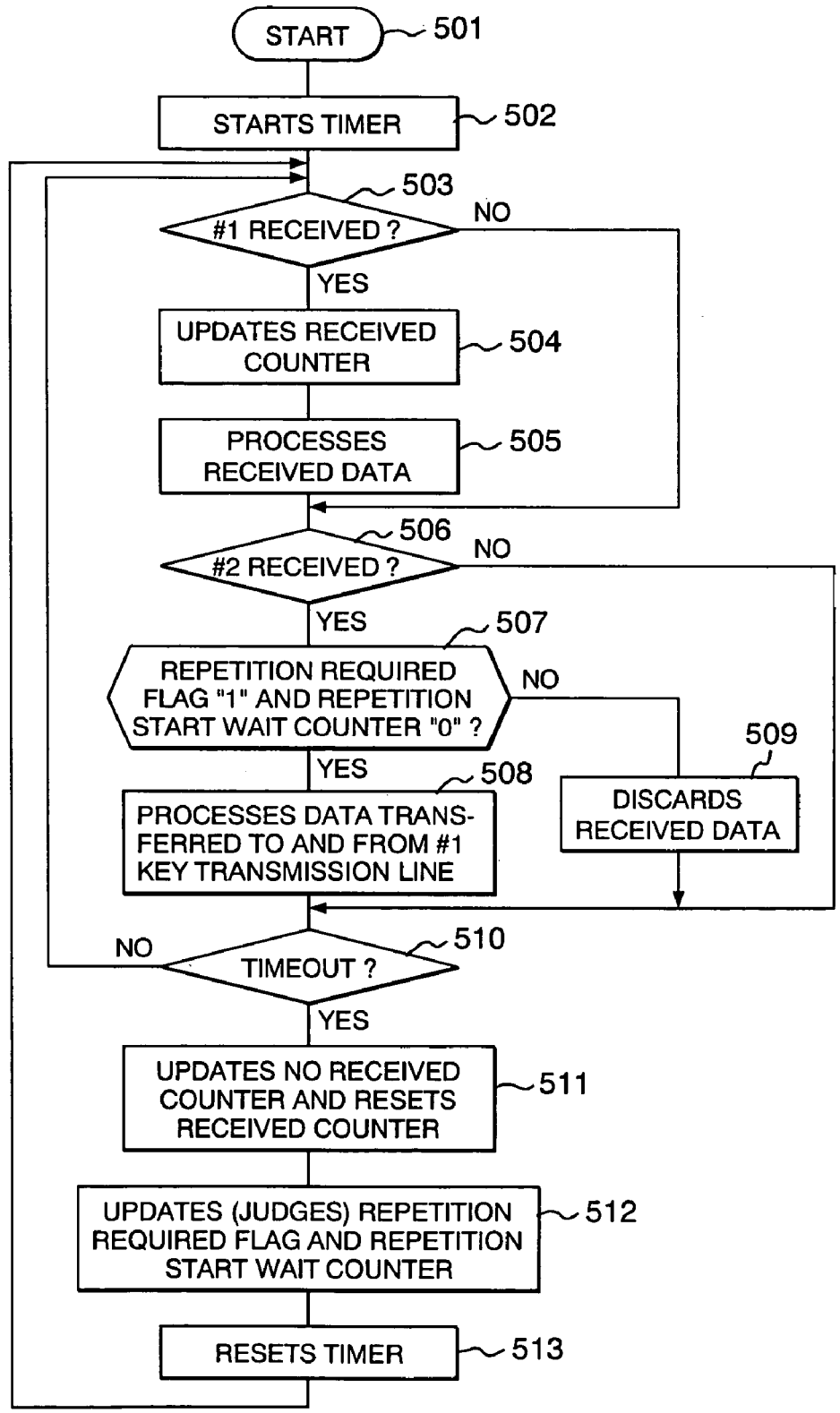
FIG. 5 is a flow sheet of data reception by transmission terminals in the first embodiment of the present invention.

FIG. 5 is a flow sheet of data reception by transmission terminals in the first embodiment of the present invention. This example shows only processing of #1 transmission terminals 11 to 41, more particularly processing of #1 transmission terminal 31 in vehicle 3 and #1 transmission terminal 41 in vehicle 4. You can get the description of processing of #2 transmission terminals 12 to 42 by exchanging key transmission lines 51 and 52. The status table of FIG. 6a and FIG. 6b will be explained below before the description of the operation flow of FIG. 5.

FIG. 6a and FIG. 6b shows status tables for reception check and data repetition in the first embodiment of the present invention. FIG. 6a shows status table 253 in memory 25 of the transmission terminal 31 of FIG. 4. FIG. 6b shows status table 254 in the transmission terminal 41 (not shown in the drawing). Each originating transmission terminal on the #1 key transmission line 51 is provided with Received counter, Not Received counter, Repetition Required Flag, and Repetition Start Wait Counter items. These items of the table are initially zeros. Each time receiving data from a transmission terminal, the transmission terminal 31 updates the content of the Received counter for the originating transmission terminal (or increments it by one). This counter is reset to a zero at each cycle (for example 10 ms). The Not Received counter checks the content of the Received counter when the Received counter is reset to zero. When the Received counter is 0, that is, when the transmission terminal 31 receives no data from the originating transmission terminal during the cycle, the Not Received counter is incremented by one. When the Received counter is not 0, that is, when the transmission terminal 31 receives any data from the originating transmission terminal during the cycle, the Not Received counter is reset to zero. The Repetition Required flag is set "1" (turned on) to indicate that there is no data reception during a preset time period (for example, 1 cycle×3 when the Not Received counter is "3") and that data repetition is required. The Repetition Required flag is reset "0" when the Received counter becomes other than 0.

A preset value (e.g. 1 to 3) is assigned to the Repetition Start Wait counter when the Repetition Required flag is set "1" and the value is decremented by one at each cycle. When the content of this counter reaches "0," the repetition starts. A value corresponding to the distance between the transmission terminal 31 and the originating transmission terminal is set to the Repetition Start Wait counter, but when there are two or more originating transmission terminals in an identical direction, a smaller value is set.

Now back to FIG. 5, the reception flow starts at step 501 when the transmission terminals are turned on. At step 502, a timer starts at the start of reception. This timer counts up one cycle (e.g. 10 ms) till timeout. Steps 503 to 510 are repeated several times for example three times till the timeout is detected.

At step 503, when receiving data from the #1 key transmission line 51, the transmission terminal 31 (or 41) increments (by one) the Received counter for the originating transmission terminal in the status table at step 504. At step 505, the transmission terminal 31 (or 41) performs data reception processing such as transferring the received data to the device control block 19 in the transmission terminal. The device control block 19 sends the data to the related devices.

When no data comes from the #1 key transmission line at the end of this reception processing or at step 503 and the Received counter is not updated, the reception check function directly checks whether data comes from the #2 key transmission line 506. When receiving data from the #2 key transmission line, the transmission terminal (31 or 41) checks whether data repetition is required and relays data if necessary at steps 507 to 509.

In other words, at step 507, the transmission terminal checks the content of the status table of FIG. 6a and FIG. 6b. When the Repetition Required flag for the originating transmission terminal is "1" and the Repetition Start Wait counter is "0," the transmission terminal goes to step 508 and passes the received data (from the #2 key transmission line 52) to the #1 key transmission line 51. At the same time, the transmission terminal 31 (or 41) performs data processing such as sending the received data (from the #2 key transmission line 52) to the device control block 19 in the transmission terminal as the data from the originating transmission terminal does not come from the #1 key transmission line. When the content of the status table is other than the above, the transmission terminal 31 (or 41) goes to step 509 and discards the received data. At step 510, the transmission terminal repeats the above steps until the timer reaches the preset time.

When one cycle (10 ms) ends and the timer expires at step 510, the transmission terminal updates the content of the Not Received counter at step 511. In other words, the transmission terminal checks the content of the Received counter of each originating transmission terminal and increments the content of the Received counter of an originating transmission terminal whose count is "0." When the Received counter of an originating transmission terminal is not 0, its Not Received counter is reset to "0." Consequently, the value of the Not Received counter indicates a time period (=Timer cycle×Not Received count) during which data does not come from the related originating transmission terminal. At the same time, transmission terminal 31 (or 41) resets the Received counters of all originating transmission terminals to "0" for the next cycle. At step 512, the transmission terminal updates the Repetition Required flag and the Repetition Start Wait counter. In other words, the transmission terminal turns on ("1") the Repetition Required flag of an originating transmission terminal whose Not Received counter exceeds the preset value (e.g. "3") and turns off ("0") the Repetition Required flag of an originating transmission terminal whose Not Received counter is "0." When turning on ("1") the Repetition Required flag, the transmission terminal sets a value on the Repetition Start Wait counter in the above-described manner. Then at step 513, the transmission terminal resets the timer and goes to the reception processing of the next cycle.

Below will be described processing of #1 transmission terminals 31 and 41 in vehicles 3 and 4, assuming that the #1 key transmission line 51 is broken between vehicles 2 and 3 as shown in FIG. 3. When a line break occurs, the transmission terminals 31 and 41 cannot receive data from the transmission terminals in vehicles 1 and 2. Consequently, the Received counters for originating vehicles 1 and 2 remain unchanged. When no data is received for one cycle (10 ms) or longer, the Received counters remain "0." Further, if no data is received for more cycles, the values of the Not Received counters keep on increasing at every cycle. As shown in FIG. 6a and FIG. 6b, when the Not Received counter reaches a preset value ("3"), the Repetition Required flag is turned on (="1"). These are the same as those of the transmission terminals 31 and 41 when the #1 key transmission line is broken (see FIG. 3) (including the Repetition Required flags of FIG. 6a and b.

When the Repetition Required flag is updated, the Repetition Start Wait count is set. A value corresponding to the distance between the vehicle 3 (or 4) and the originating vehicle (2 or 1) is set to the Repetition Start Wait counter. In FIG. 6a, the value is "1" for the originating vehicle 2 and "2" for the originating vehicle 1. However, when there are two or more originating transmission terminals in an identical direction, a smaller value is set. The value set for the Repetition Start Wait counter is immediately reset to "0" by the update processing of the Repetition Start Wait counter. This value change is expressed by "1→0" in FIG. 6a.

At about the same time when the #1 transmission terminal 31 in vehicle 3 detects a line break, the #1 transmission terminal 41 in vehicle 4 detects the line break. The values of the Repetition Start Wait counters are all set to a smaller value "2" because the values are "2" and "3" and the originating transmission terminals are in an identical direction. As shown by "2→1" in FIG. 6b, the values of the Repetition Start Wait counters are "1" at the end of the update processing of the Repetition Start Wait counters.

At this time point, the #1 transmission terminal 31 in vehicle 3 starts data repetition when the Repetition Required flag is "1" and the Repetition Start Wait counter is "0." After this, the #1 transmission terminal 31 in vehicle 3 receives data (originated by transmission terminals in vehicles 1 and 2) from the #2 key transmission line 52 and passes it to the #1 key transmission line 51. In this case, the Repetition Required flag of the #1 transmission terminal 41 in vehicle 4 turns on (="1"), but the #1 transmission terminal 41 receives data which is repeated by the #1 transmission terminal 31 in vehicle 3 before the Repetition Start Wait counter becomes "0" in the next cycle. Consequently, the content of the Received counter in FIG. 6b becomes other than "0" and the Repetition Required flag is reset. With this, data repetition is not carried out.

If any failure in vehicle 3 disables data repetition, the transmission terminal 41 cannot receive data that is repeated by the #1 transmission terminal 31 in vehicle 3. Therefore, the Received counter of FIG. 6b holds "0" also in the next cycle and the contents of the Repetition Start Wait counters for the originating vehicles 1 and 2 become "0." As the result, transmission terminal 41 in vehicle 4 carries out data repetition.

If the line break is a temporary failure such as an improper contact instead of a line disconnection between vehicles 2 and 3 and the data transmission is recovered, the transmission terminal in a vehicle that is repeating data resets the Repetition Required flag and stops data repetition.

Figure 7:
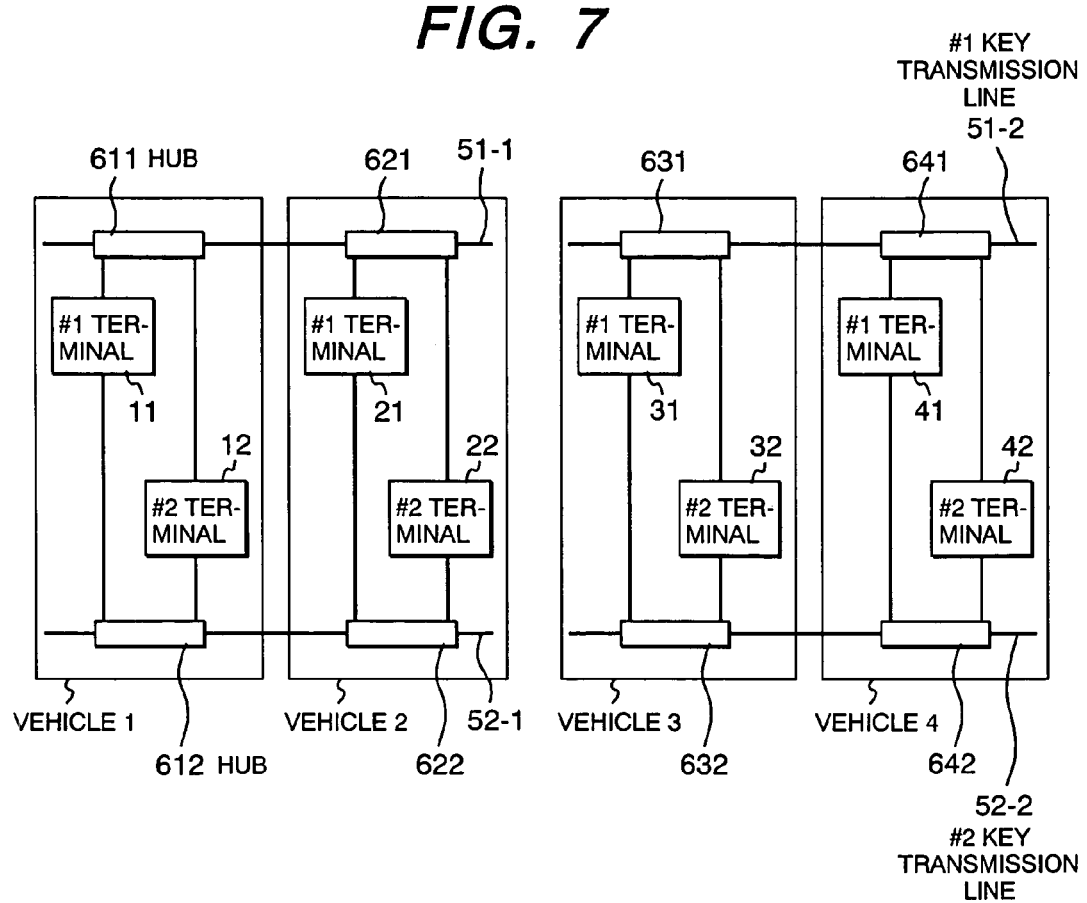
FIG. 7 shows a schematic diagram of an information transmission system which is the first embodiment of the present invention and has its vehicles separated.

FIG. 7 shows a schematic diagram of an information transmission system which is the first embodiment of the present invention and has its vehicles separated. The device configuration of each vehicle of FIG. 7 is basically the same as that of FIG. 1, in which like reference numerals represent the same or similar elements. In FIG. 7, only the #1 and #2 key transmission lines 51 and 52 are respectively divided into two (51-1, 51-2 and 52-1, 52-2) and the other network configuration is the same as that of FIG. 1. Therefore, the data relaying functions work effectively also in this divided configuration as already described above. When the vehicles are re-connected in FIG. 7, the network configuration becomes equal to that of FIG. 1 and the data relaying functions also work effectively.

As already described, this embodiment transmits data to both key transmission lines. If any failure disables data transmission on either of the key transmission lines, the data relaying function plays a role to transmit data again through both key transmission lines. Therefore, even when multiple failures occur, the information transmission system can continue transmission without a break. Further, data repetitions at the occurrence of failures are all carried out autonomously without information exchange between transmission terminals.

In the above description, the first embodiment assumes that the #1 and #2 transmission terminals respectively transmit data to #1 and #2 key transmission lines 51 and 52. However, it is possible, as a second embodiment, to cause the #1 transmission terminals 11 to 41 to transmit data to the #1 key transmission line 51 and the #2 transmission terminals 12 to 42 to transmit data to the #2 key transmission line 52. More specifically, in FIG. 3, you stop data transmission from the #1 transmission terminal 11 to the #2 key transmission line 52 and start data transmission from the #2 transmission terminal 12 to the #2 key transmission line 52. In this case, the #1 and #2 transmission terminals need not be synchronized for transmission. Naturally also in this case, the receiving transmission terminal checks the status of reception of data from each originating vehicle and passes the received data (coming from the originating vehicle through a non-faulty key transmission line) to the other key transmission line if either of the key transmission lines is disabled to transfer the data from the vehicle. In this example, only the transmission lines of the originating transmission terminals are different but the content of transmission data can be identical. As the result, devices can be controlled in the similar manner. The result in data transmission in vehicles 2 to 4 is the same as that of FIG. 3.

The transmission processing of the second embodiment can be simplified as each transmission terminal transmits data to only one of the key transmission lines. In this case, #1 and #2 transmission terminals in each vehicle must handle identical data. Information specific to each transmission terminal such as its internal information cannot be transmitted. Further, the first embodiment enables device-to-device transmission as long as one of the transmission terminals is available and can form a standby dual-system, but both terminals must be available for device-to-device transmission in the second embodiment.

Figure 8:
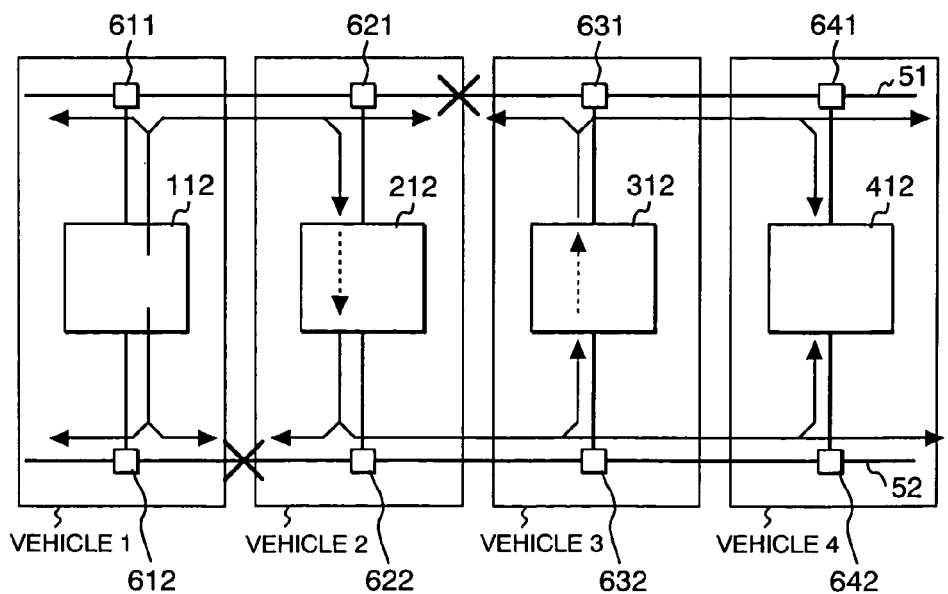
FIG. 8 shows a schematic diagram of a railway information transmission system which is the third embodiment of the present invention.

FIG. 8 shows a schematic diagram of a railway vehicle information transmission system which is a third embodiment of the present invention. In FIG. 8 and FIG. 1, like reference numerals represent the same or similar elements. The third embodiment is the same as the first embodiment with the exception that the transmission terminals 112 to 412 are not duplicated in the vehicles 1 to 4, that is, they are in a simplex system. More specifically, the third embodiment is the same as the first embodiment in that the transmission terminals have an identical configuration, that each of the transmission terminals has a reception check function and a data relaying function, and that devices in each vehicle is connected to the transmission terminals in the vehicle. FIG. 8 shows a flow of data among transmission terminals in the railway information transmission system in case several disconnection failures occur in the system, assuming that disconnections occur on the #1 key transmission line 51 between vehicles 2 and 3 (on the x-marked point) and on the #2 key transmission line 52 between vehicles 1 and 2 (on the x-marked point) and that the transmission terminal 112 transmits data to both key transmission lines 51 and 52. When no failure occurs in the system, transmission terminals 212 to 412 respectively receive identical data from both key transmission terminals 51 and 52. When failures occur on the x-marked points, the transmission terminal 212 in vehicle 2 knows that data originated by the transmission terminal 112 does not come from the #2 key transmission line 52 by the reception check function of the transmission terminal 212 and causes the data relaying function to pass the received data (of vehicle 1 through the #1 key transmission line 51) to the #2 key transmission line 52. With this, the transmission terminals 212 to 412 can receive data originated by the transmission terminal 112 through the #2 key transmission line 52. Similarly, the transmission terminal 312 in vehicle 3 knows that data originated by the transmission terminal 112 does not come through the #1 key transmission line 51 by the reception check function of the transmission terminal 312 and passes the received data (of the transmission terminal 112 through the #2 key transmission line 52.) to the #1 key transmission line 51. With this, the transmission terminal 412 can receive data originated by the transmission terminal 112 through the #1 key transmission line 51.

As the transmission terminals in vehicles are simplex, the third embodiment has a simpler device configuration than the first embodiment. Although the third embodiment having a simplex terminal configuration is a little inferior to the other embodiments in reliability, the third embodiment is still very reliable as the network itself is redundant and each transmission terminal is equipped with a data relaying function.

Figure 9:
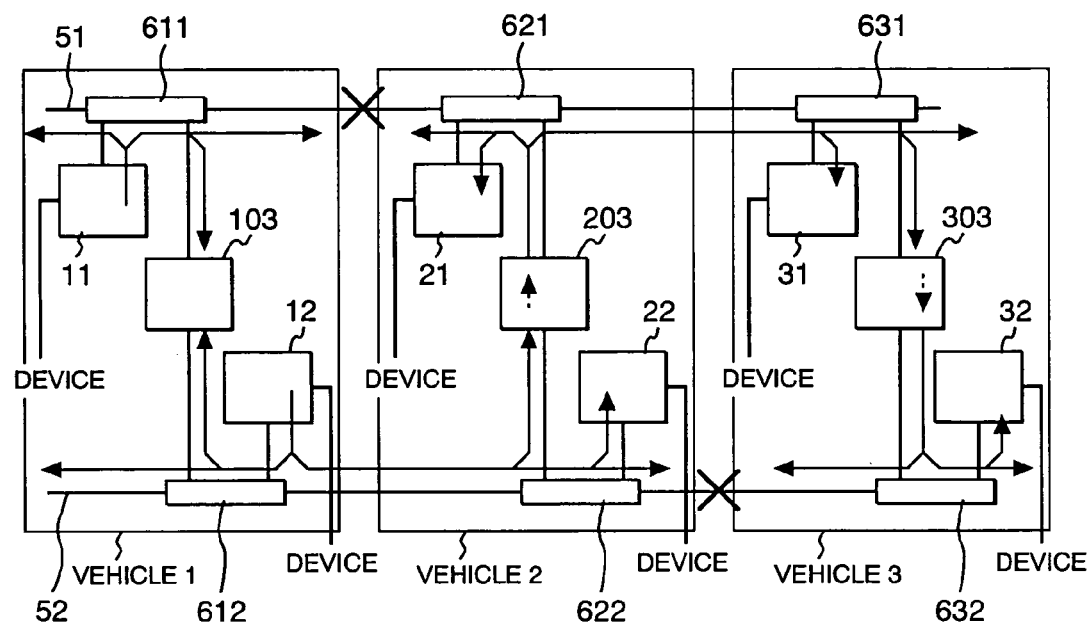
FIG. 9 shows a schematic diagram of railway information transmission system which is the fourth embodiment of the present invention.

FIG. 9 shows a schematic diagram of a railway vehicle information transmission system which is a fourth embodiment of the present invention. In FIG. 9 and FIG. 1, like reference numerals represent the same or similar elements. The train of the fourth embodiment comprises three vehicles. Each vehicle contains a repeating terminal (103, 203, or 303) in addition to transmission terminals (11 to 31 and 12 to 32) which are respectively connected to either of the key transmission lines. Each repeating terminal is equipped with a reception check function and the data relaying function.

When data does not come from one of the key transmission lines, the repeating terminal (103, 203, or 303) relays the received data (from the other key transmission line) to the key transmission line. FIG. 9 shows a flow of data in case the same failures as those of FIG. 3 occur. FIG. 9 is different from FIG. 3 only in that the repeating terminals 103 to 303 instead of transmission terminals 11 to 31 and 12 to 32 respectively have a repeating function. The functions thereof will be readily understood.

This embodiment separates the transmission terminals that transfer data between devices and key transmission lines from the repeating terminals which checks the reception status and relays data when no data is coming. This makes the fourth embodiment more complicated than the first embodiment but makes the processing of each terminal simpler.

The fourth embodiment assumes that the transmission terminal 11 in vehicle 1 transmits data to the #1 key transmission line 51 and that the transmission terminal 12 in vehicle 1 transmits data to the #2 key transmission line 52. It is possible, as a fifth embodiment, to make the repeating terminal 103 receive data originated by the transmission terminal 11 through the #1 key transmission line 51 and relay it directly to the #2 key transmission line 52. This enables the data originated by the transmission terminal 11 to flow through both transmission lines 51 and 52. In this case, the arrow just below the repeating terminal 103 is singly reversed and the data flow to vehicles 2 and 3 in FIG. 9 remains unchanged.

Although the data handled by #1 and #2 transmission terminals in each vehicle must be identical in the fourth embodiment, the data need not be identical in the fifth embodiment and further terminal-specific information such as internal information of each transmission terminal can be transmitted. Furthermore, information of devices in each vehicle can be transmitted as long as either of the #1 and #2 transmission terminals is active and a standby dual-system can be formed. However, the fourth embodiment requires that both #1 and #2 transmission lines are available.

Figure 10:
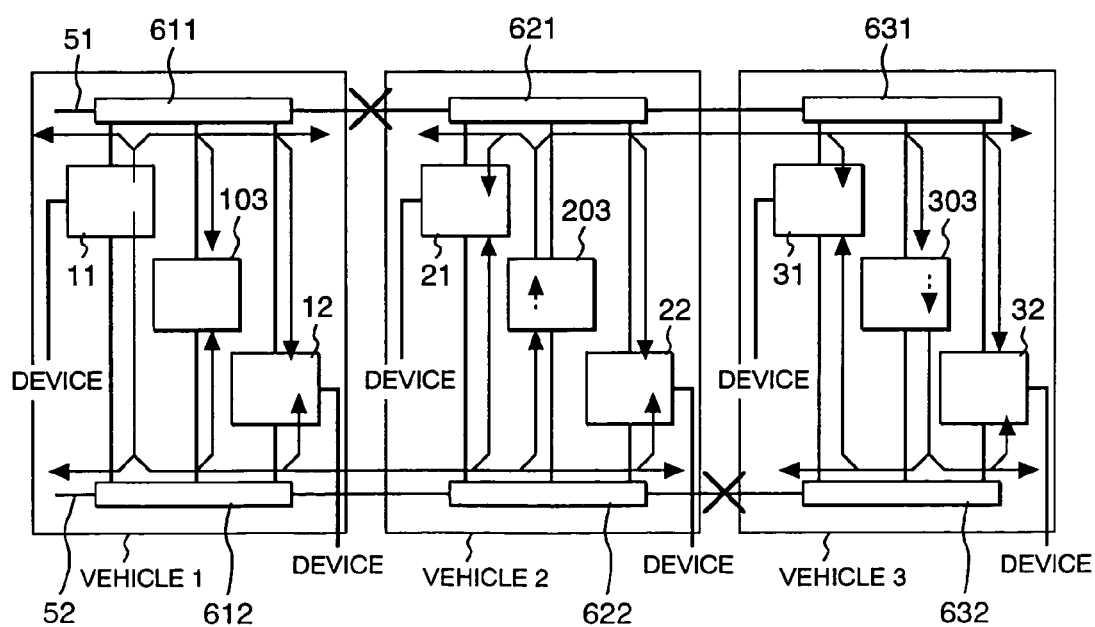
FIG. 10 shows a schematic diagram of railway information transmission system which is the sixth embodiment of the present invention.

FIG. 10 shows a schematic diagram of a railway vehicle information transmission system which is a sixth embodiment of the present invention. In FIG. 9 and FIG. 10, like reference numerals represent the same or similar elements. The sixth embodiment is almost the same as the fifth embodiment with the exception that each transmission terminal is connected to both key transmission lines. FIG. 10 shows a flow of data among transmission terminals in case similar disconnections occur in the system. Unlike the fifth embodiment, as the sixth embodiment connects each transmission terminal to both key transmission lines, the sixth embodiment can transmit device data of each vehicle as long as either of the #1 and #2 transmission terminals is active. This enables configuration of a standby dual-system. Further, in this embodiment, the #1 and #2 transmission terminals need not transmit identical data and can transmit different kinds of information such as their internal information.

Figure 11:
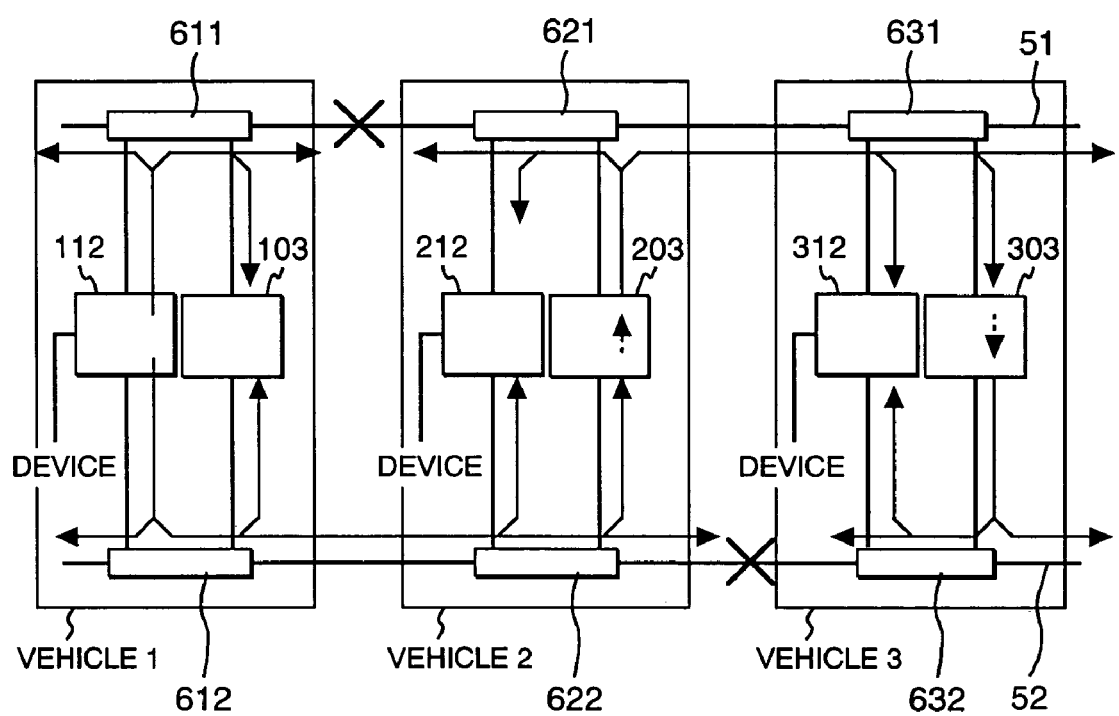
FIG. 11 shows a schematic diagram of railway information transmission system which is the seventh embodiment of the present invention.

FIG. 11 shows a schematic diagram of a railway vehicle information transmission system which is a seventh embodiment of the present invention. In FIG. 8 and FIG. 11, like reference numerals represent the same or similar elements. The train of the seventh embodiment comprises three vehicles. FIG. 8 and FIG. 11 are almost the same with the exception that each vehicle contains a repeating terminal (103, 203, or 303) in addition to transmission terminals (112 to 312) which are respectively connected to both key transmission lines. As described for FIG. 9 and FIG. 10, each repeating terminal is equipped with a reception check function and a data relaying function. When data does not come from one of the key transmission lines, the repeating terminal relays the received data to the other key transmission line.

In accordance with the above embodiments that transmit identical data to two key transmission lines and check the data reception status at each transmission terminal, if a transmission terminal cannot receive data from one of the key transmission lines, it passes (or relays) the data coming from the non-faulty transmission line to the other key transmission line. Therefore, even when a disconnection or a device failure occurs, the data transmission to the key transmission lines is continued by the repeating function. Therefore, the present invention can build up a high-reliability network that can continue transmission even when several failures occur in the network.

What is claimed is:

1. An information transmission system comprising:
   a timer;
   a first transmission line;
   a second transmission line; and
   a plurality of transmission terminals that are connected to both the first transmission line and the second transmission line,
   wherein each of said transmission terminals comprises:
      a relaying means;
      a device controller comprising a device control block; and
      a communication controller comprising a storage area, wherein the storage area comprises a status table, and wherein the status table comprises:
         a first counter that indicates that data has been received;
         a second counter that indicates that no data has been received;
         a repetition required flag that indicates that there is no data reception during a preset time period and that data repetition is required; and
         a third counter that indicates that data repetition is required,
         wherein the third counter is assigned a value when the repetition required flag is set to indicate that data repetition is required,
   wherein each of said transmission terminals receives information from a sender via one or both of the first transmission line and the second transmission line,
   wherein each of the transmission terminals determines whether a failure has occurred on either the first transmission line or the second transmission line by checking whether the information is being transferred on the first transmission line and is not being transferred on the second transmission line,
   wherein a determination that the information is being transferred on the first transmission line and is not being transferred on the second transmission line indicates a failure has occurred on the second transmission line,
   wherein when no failure occurs on the first transmission line and no failure occurs on the second transmission line, the relaying means of the transmission terminals do not relay the information to the first transmission line or the second transmission line, and each of the transmission terminals receives the information from the sender via both the first transmission line and the second transmission line,
   wherein when a failure occurs on the first transmission line, such that a first transmission terminal determines that the information is being transferred on the first transmission line and is not being transferred on the second transmission line, the first transmission terminal receives the information from the sender via the first transmission line, and a first relaying means of the first transmission terminal transfers the received information to the second transmission line such that the information is present on both the first transmission line and the second transmission line at the first terminal, wherein the timer starts at the start of reception of the information by each of said transmission terminals, wherein the first transmission terminal:
(a) increments the first counter when the first transmission terminal receives the information from the first transmission line;
(b) determines whether the information is being transmitted from the second transmission line when no information is received by the first transmission terminal;
(c) checks the repetition required flag and the third counter to determine whether data repetition is required when the information is being transmitted from the second transmission line;
(d) relays the information to the first transmission line and sends the information to the device control block when the repetition required flag and the third counter indicate that data repetition is required;
(e) discards the information when data repetition is not required; and
(f) determines whether the timer has reached a preset time, wherein when the first transmission terminal determines that the timer has not reached the preset time, the first transmission terminal repeats (a)-(f), and wherein when the first transmission terminal determines that the timer has reached the preset time, the first transmission terminal:
increments the second counter and resets the first counter;
sets the repetition required flag to indicate that there is no data reception during the preset time period and that data repetition is required;
decrements the third counter; and
resets the timer.

2. The information transmission system according to claim 1, wherein said information transmission system is equipped with a means which preferentially relays information to a relaying means of a transmission terminal close to said sender.

3. The information transmission system according to claim 1,
wherein each of said transmission terminals is equipped with means to send information from said terminal to the other transmission terminal, and
wherein each of said transmission terminals is equipped with means to send information from said terminal to the other transmission terminal over one of said first transmission line and said second transmission line if determined to be necessary.

4. The information transmission system according to claim 3, wherein said information transmission system is equipped with a means which preferentially relays information to a relaying means of a transmission terminal close to said sender.

5. An information transmission system for railway vehicles comprising:
a timer;
a first transmission line and a second transmission line which connect a plurality of vehicles constituting a railway train; and
a plurality of transmission terminals which are connected to said first transmission line and said second transmission line,
wherein each of said transmission terminals comprises:
a relaying means;
a device controller comprising a device control block; and
a communication controller comprising a storage area, wherein the storage area comprises a status table, and wherein the status table comprises:
a first counter that indicates that data has been received;
a second counter that indicates that no data has been received;
a repetition required flag that indicates that there is no data reception during a preset time period and that data repetition is required; and
a third counter that indicates that data repetition is required,
wherein the third counter is assigned a value when the repetition required flag is set to indicate that data repetition is required, wherein each of said transmission terminals in respective vehicles receives information from a sender in one of the respective vehicles separately via one or both of the first transmission line and the second transmission line, wherein each of the transmission terminals determines whether a failure has occurred on either the first transmission line or the second transmission line by checking whether the information is being transferred on the first transmission line and is not being transferred on the second transmission line, wherein a determination that the information is being transferred on the first transmission line and is not being transferred on the second transmission line indicates a failure has occurred on the second transmission line, wherein when no failure occurs on the first transmission line and no failure occurs on the second transmission line, the relaying means of the transmission terminals do not relay the information to the first transmission line or the second transmission line, and each of the transmission terminals receives the information from the sender via both the first transmission line and the second transmission line, wherein when a failure occurs on the first transmission line, such that a first transmission terminal determines that the information is being transferred on the first transmission line and is not being transferred on the second transmission line, the first transmission terminal receives the information from the sender via the first transmission line, and a first relaying means of the first transmission terminal transfers the received information to the second transmission line such that the information is present on both the first transmission line and the second transmission line at the first terminal, wherein the timer starts at the start of reception of the information by each of said transmission terminals, wherein the first transmission terminal:
(a) increments the first counter when the first transmission terminal receives the information from the first transmission line;
(b) determines whether the information is being transmitted from the second transmission line when no information is received by the first transmission terminal;
(c) checks the repetition required flag and the third counter to determine whether data repetition is required when the information is being transmitted from the second transmission line;
(d) relays the information to the first transmission line and sends the information to the device control block when the repetition required flag and the third counter indicate that data repetition is required;

(e) discards the information when data repetition is not required; and (f) determines whether the timer has reached a preset time, wherein when the first transmission terminal determines that the timer has not reached the preset time, the first transmission terminal repeats (a)-(f), and wherein when the first transmission terminal determines that the timer has reached the preset time, the first transmission terminal:

increments the second counter and resets the first counter;

sets the repetition required flag to indicate that there is no data reception during the preset time period and that data repetition is required;

decrements the third counter; and resets the timer.

6. The information transmission system according to claim 5, wherein each of said railway vehicles has two of said transmission terminals, each of which has a means to respectively send information over one of said first transmission line and said second transmission line when said transmission terminal sends information from the vehicle having the transmission terminal to the other vehicle, if necessary.

7. An information transmission method of an information transmission system, wherein said information transmission system comprises a timer, a first transmission line, a second transmission line, and a plurality of transmission terminals which are connected to both of said first transmission line and said second transmission line, wherein each of the transmission terminals comprises: a relaying means; a device controller comprising a device control block; and a communication controller comprising a storage area, wherein the storage area comprises a status table, and wherein the status table comprises: a first counter that indicates that data has been received; a second counter that indicates that no data has been received; a repetition required flag that indicates that there is no data reception during a preset time period and that data repetition is required; and a third counter that indicates that data repetition is required, wherein the third counter is assigned a value when the repetition required flag is set to indicate that data repetition is required, and wherein said method comprises the steps of:

causing said transmission terminals to receive information from a sender separately via one or both of the first transmission line and the second transmission line; and determining, by each of the transmission terminals, whether a failure has occurred on either the first transmission line or the second transmission line by checking whether the information is being transferred on the first transmission line and is not being transferred on the second transmission line, wherein a determination that the information is being transferred on the first transmission line and is not being transferred on the second transmission line indicates a failure has occurred on the second transmission line, wherein when no failure occurs on the first transmission line and no failure occurs on the second transmission line, the relaying means of the transmission terminals do not relay the information to the first transmission line or the second transmission line, and each of the transmission terminals receives the information from the sender via both the first transmission line and the second transmission line, wherein when a failure occurs on the first transmission line, such that a first transmission terminal determines that the information is being transferred on the first transmission line and is not being transferred on the second transmission line, the first transmission terminal receives the information from the sender via the first transmission line, and a first relaying means of the first transmission terminal transfers the received information to the second transmission line such that the information is present on both the first transmission line and the second transmission line at the first terminal, wherein the timer starts at the start of reception of the information by each of said transmission terminals, wherein the first transmission terminal performs the steps of:

(a) incrementing the first counter when the first transmission terminal receives the information from the first transmission line;

(b) determining whether the information is being transmitted from the second transmission line when no information is received by the first transmission terminal;

(c) checking the repetition required flag and the third counter to determine whether data repetition is required when the information is being transmitted from the second transmission line;

(d) relaying the information to the first transmission line and sends the information to the device control block when the repetition required flag and the third counter indicate that data repetition is required;

(e) discarding the information when data repetition is not required; and (f) determining whether the timer has reached a preset time, wherein when the first transmission terminal determines that the timer has not reached the preset time, the first transmission terminal repeats (a)-(f), and wherein when the first transmission terminal determines that the timer has reached the preset time, the first transmission terminal performs the steps of:

incrementing the second counter and resets the first counter;

setting the repetition required flag to indicate that there is no data reception during the preset time period and that data repetition is required;

decrementing the third counter; and resetting the timer.

8. A transmission terminal that receives information from one or both of a first transmission line and a second transmission line, the transmission terminal comprising:

a device controller comprising a device control block; and a communication controller comprising a storage area, wherein the storage area comprises a status table, wherein the status table comprises:

a first counter that indicates that data has been received;

a second counter that indicates that no data has been received;

a repetition required flag that indicates that there is no data reception during a preset time period and that data repetition is required; and a third counter that indicates that data repetition is required, wherein the third counter is assigned a value when the repetition required flag is set to indicate that data repetition is required, wherein a timer starts at the start of reception of the information by said transmission terminal, wherein the transmission terminal:

(a) increments the first counter when the transmission terminal receives the information from the first transmission line;

(b) determines whether the information is being transmitted from the second transmission line when no information is received by the transmission terminal;
(c) checks the repetition required flag and the third counter to determine whether data repetition is required when the information is being transmitted from the second transmission line;
(d) relays the information to the first transmission line and sends the information to the device control block when the repetition required flag and the third counter indicate that data repetition is required;
(e) discards the information when data repetition is not required; and
(f) determines whether the timer has reached a preset time, wherein when the transmission terminal determines that the timer has not reached the preset time, the transmission terminal repeats (a)-(f), and wherein when the transmission terminal determines that the timer has reached the preset time, the transmission terminal:

increments the second counter and resets the first counter;

sets the repetition required flag to indicate that there is no data reception during the preset time period and that data repetition is required;

decrements the third counter; and resets the timer.

* * * * *